UNITED STATES PATENT OFFICE.

WILLIAM BLACK AND HARRY S. RICHARDS, OF CHICAGO, ILLINOIS.

PROCESS OF FINISHING ARTIFICIAL STONE.

SPECIFICATION forming part of Letters Patent No. 716,371, dated December 23, 1902.

Application filed January 14, 1902. Serial No. 89,756. (No specimens.)

*To all whom it may concern:*

Be it known that we, WILLIAM BLACK and HARRY S. RICHARDS, citizens of the United States, residing at Chicago, county of Cook, State of Illinois, have invented a certain new and useful Improvement in Processes of Finishing Artificial Stone; and we declare the following to be a full, clear, and exact description of the invention, such as will enable others skilled in the art to which it pertains to make and use the same.

Our invention relates in general to artificial stone, and more particularly to a process for producing a natural finish.

Artificial stone as usually manufactured consists in a composition of sand or particles of limestone or granite united by cement. The cement around the sand or other ingredient on the surface of the artificial stone greatly lessens its natural appearance, as the eye of an observer is at once attracted by the cement.

The object of our invention is to produce a natural finish upon artificial stone. We attain this object by removing the cement from the surface of the artificial stone and also from around and between the superficial particles of sand or stone, so that the appearance of the cement is not readily detected, as the projecting particles of sand or stone are more noticeable and the artificial character of the stone rendered less apparent.

Our invention, generally stated, consists in a process of so treating artificial stone after it has been molded in the desired form that the particles of sand or stone on the surface of the artificial stone will project beyond the cement.

Our invention further consists in a process for producing on artificial stone a natural appearance by subjecting the molded stone to a bath of acid solution, which will remove the cement from around the particles of stone or sand at the surface of the artificial stone.

The following is a description in detail of our invention.

The artificial stone may be made in any suitable manner and may consist in the usual ingredients—such, for instance, as sand or particles of limestone or granite united by cement. Pigments of any desired color may also be added to the composition to produce an artificial stone resembling natural stone of a color different from that of the sand or particles of stone used in the composition. For instance, red pigments may be added when it is desired to produce artificial red sandstone. After the composition has been molded and has hardened it is subjected to such a treatment as will remove the cement from around the superficial particles of the sand or stone used in the composition. A treatment which we have found in practice to be well adapted to produce the desired result is a bath consisting in a solution of acid— such, for instance, as five parts of water and one part of muriatic acid when the composition is at a temperature of about 80° Fahrenheit. The acid attacks the cement and eats the same away from the surface of the artificial stone and also from around the superficial particles of sand or stone, so as to leave the latter projecting slightly beyond the cement, thereby rendering the cement less noticeable to the eye of an observer. After removing the artificial stone from the acid-solution bath it may be rinsed off in clear water, so as to remove the acid solution from the surface of the artificial stone, after which, if desired, it may be immersed in a bath of neutralizing solution—such, for instance, as one pound of carbonate of soda in two gallons of water—in order to neutralize any acid which may remain on the surface of the stone. The stone may then be again rinsed off in water to remove the neutralizing solution.

While we have referred to a solution of muriatic acid as being used to produce the desired effect upon the surface of the stone, we do not wish to limit ourselves thereto, as any treatment which will by removing the cement around the particles of sand or stone, cause the latter to project slightly beyond the cement is within the scope of our invention; nor do we wish to limit ourselves to the particular neutralizing solution referred to, nor, in fact, to the use of a neutralizing solution at all, as the mere removal of the artificial stone from the bath of the said solution when the desired effect has been produced need not necessarily be followed by any other treatment in order to impart to the artificial stone the desired natural finish.

Having now fully described our invention, what we claim as new, and desire to secure by Letters Patent, is—

1. The process of producing a natural finish on artificial stone composed of cement and particles of natural stone which consists in removing the cement from around the superficial ingredient particles of the composition.

2. The process of treating artificial stone composed of cement and particles of natural stone which consists in subjecting the composition to a bath of acid solution.

3. The process of treating artificial stone composed of cement and particles of natural stone which consists in subjecting the composition first to a bath of acid solution and subsequently to a bath of a neutralizing solution.

4. The process of treating artificial stone composed of cement and particles of natural stone which consists in subjecting the composition to a solution of muriatic acid.

5. The process of treating artificial stone composed of cement and particles of natural stone which consists in subjecting the composition first to a solution of muriatic acid and subsequently to a bath of neutralizing solution.

6. The process of treating artificial stone which consists in subjecting the same first to a solution of muriatic acid and subsequently to a solution of carbonate of soda.

7. In the art of manufacturing artificial stone, the process of producing a natural finish which consists in subjecting the stone when molded and dried to a solution of muriatic acid, then rinsing the same in water, then subjecting the same to a solution of carbonate of soda, and finally rinsing the same in water.

In testimony whereof we sign this specification in the presence of two witnesses.

WILLIAM BLACK.
HARRY S. RICHARDS.

Witnesses:
GEO. L. WILKINSON,
CLARA C. CUNNINGHAM.